United States Patent [19]

Beggs et al.

[11] 4,384,020
[45] May 17, 1983

[54] HONEYCOMB NOISE ATTENUATING STRUCTURES

[75] Inventors: Stanley L. Beggs, Chula Vista; Frank J. Riel, San Diego; D. W. R. Lawson, Bonita, all of Calif.

[73] Assignee: Rohr Industries, Inc., Chula Vista, Calif.

[21] Appl. No.: 338,361

[22] Filed: Jan. 11, 1982

Related U.S. Application Data

[62] Division of Ser. No. 219,219, Dec. 22, 1980.

[51] Int. Cl.³ .............................................. B32B 3/12
[52] U.S. Cl. .................................... 428/138; 55/276; 181/292; 428/116; 428/593; 428/408
[58] Field of Search ................. 428/116, 73, 116, 118, 428/138, 593, 596, 608, 408; 55/276, 525, 527; 181/292

[56] References Cited

U.S. PATENT DOCUMENTS

| 3,166,149 | 1/1965 | Hulse et al. | 428/118 X |
|---|---|---|---|
| 3,502,171 | 3/1970 | Cowan | 428/116 X |
| 3,690,606 | 9/1972 | Pall | 428/116 X |
| 3,693,750 | 9/1972 | Takkunen | 428/116 X |
| 3,713,959 | 1/1973 | Rottmayer et al. | 428/116 X |

Primary Examiner—Henry F. Epstein
Attorney, Agent, or Firm—Patrick J. Schlesinger; Frank D. Gilliam

[57] ABSTRACT

Honeycomb noise attenuation sandwich panels and method of construction having a cellular core positioned between and bonded to two facing sheets. One facing sheet is perforated and the other imperforate. A thin sheet of porous fibrous felt or fabric is bonded to the perforated sheet. The core cells communicate with the atmosphere through the perforated sheet and the pores of the fibrous sheet.

8 Claims, 2 Drawing Figures

HONEYCOMB NOISE ATTENUATING STRUCTURES

This is a division, of application Ser. No. 219,192, filed 12/22/80.

BACKGROUND OF THE INVENTION

This invention relates to new and improved noise attenuating panel and more particularly to a honeycomb panel having a perforated facing sheet with a porous layer bonded thereto allowing communication between the core cells and the atmosphere adjacent to the noise to be attenuated.

In making sound suppressive honeycomb sandwich panels which are exposed to the sound of jet engines and other noise producing mechanisms it is common practice to provide a honeycomb sandwich structure wherein a central backing layer of thin sheet of suitable material is mounted to one face of the core and a facing of thin, perforated, sound pervious sheet material is applied to the other core surface.

Panels of this type construction, although satisfactory for some sound frequencies, are found to be an inefficient noise attenuator over a broad range of frequencies customarily encountered in aircraft jet engines.

SUMMARY OF THE INVENTION

It is the primary objective of the present invention to provide a sound absorption honeycomb material that includes a thin porous material having a flow resistance such that it provides the proper degree of damping to insure efficient noise attenuation over the broad range of frequencies customarily encountered in aircraft jet engines.

BRIEF DESCRIPTION OF THE DRAWINGS

The foregoing objective and advantages of the invention will be apparent from the following description and accompanying drawings, wherein.

DETAILED DESCRIPTION OF THE INVENTION

Figure 1:
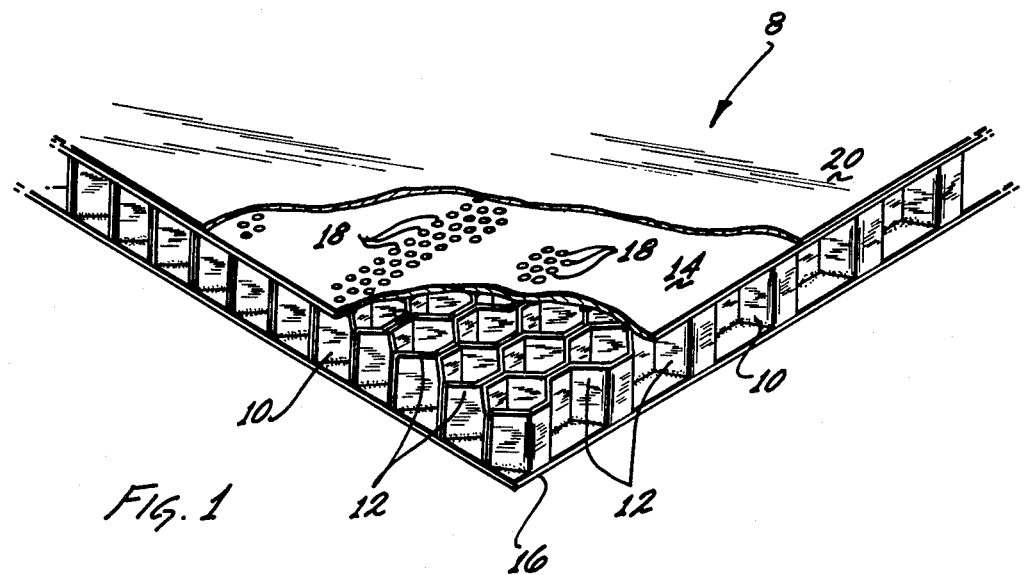
FIG. 1 is a perspective view of the acoustical honeycomb sandwich panel.
Figure 2:
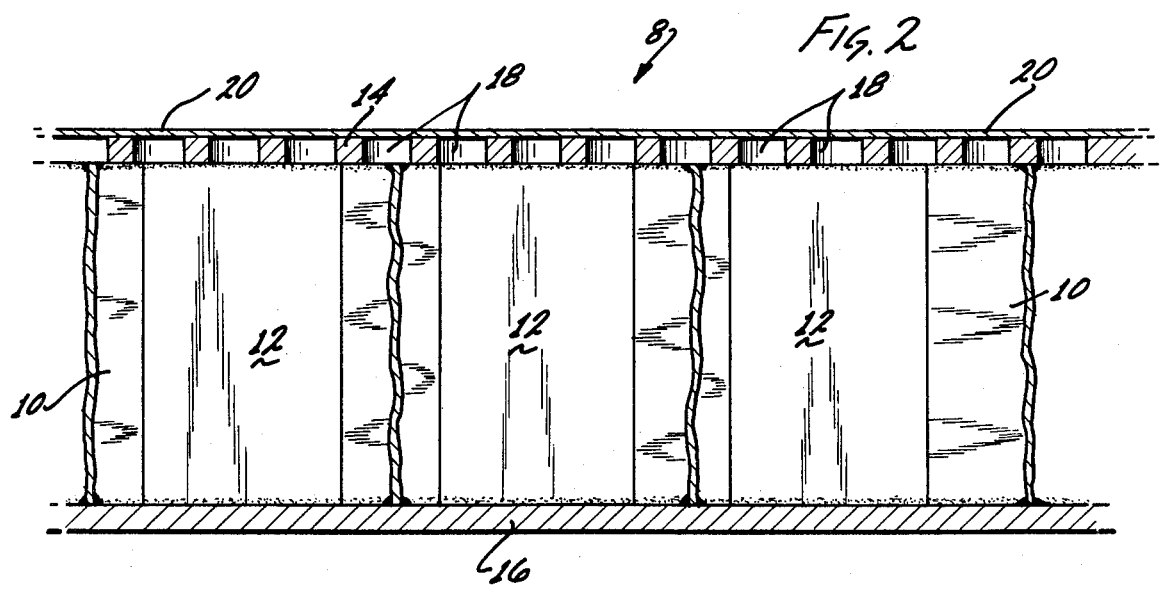
FIG. 2 is a fragmentary vertical section of the panel in FIG. 1

Referring now to the drawings in detail. A honeycomb sandwich panel 8 embodying the instant invention is shown in FIGS. 1 and 2. The sandwich comprises a single honeycomb core 10 having a usual multiplicity of endwise directed cells 12 therein, and with thin outer facing sheets 14, 16.

Facing sheet 14 is perforated and has a multiplicity of small perforations 18. Sheet 16 is imperforate. The core 10 and facing sheets 14, 16 may be constructed of like or unlike material suitable for the use for which the panel is intended. For use in aircraft jet engine inlet and nacelle structure, for example, such material as aluminum, stainless steel, iron, titanium and the like may be preferred. For other uses of the panel such materials as "paper, plastic, fiber reinforced plastic, or the like" may be preferred because of economic cost. The face sheets 14, 16 are selected of sufficient thickness to carry required loads commonly encountered.

A thin porous sheet 20 is bonded to the perforated face sheet 14. This porous sheet suitable for aircraft application is constructed of diffusion bonded metallic fiberous felt or fabric. The porous material may also be constructed of fibers woven in a conventional manner. The porous material 20 may be constructed of various other fiberous materials including graphite or the like as well as any suitable organic or non-organic non-metallic material for similar or different panel application.

For some applications requiring a woven material it may be required that the fiber cross-over points be joined while unjoined fibers would be equally suitable for other applications.

The porous sheet 20 is attached to the outer surface of the perforated sheet 14 by an adhesive bonding process in which the adhesive is selected from a class of systems whose melt viscosity, during the curing process, is sufficiently high so that the adhesive will not flow into the pores of the porous sheet by capillary attraction. This results in maintaining the full porosity of the porous sheet material over the holes in the perforated face sheet 14. The low flow of the adhesive system in addition enhances the performance of the structure through improved durability in a corrosive environment, in that the adhesive serves to electrically insulate dissimilar metals. This insulation prevents the formation of galvanic couples, which are the major cause of corrosion and bond line delamination.

While there has been shown and described the fundamental novel feature of this invention as applied to the preferred embodiment, it will be understood that various omissions and substitutions and changes in the form and details of the device illustrated may be made by those skilled in the art without departing from the spirit of the invention. It is the intention therefore to be limited only by the scope of the following claims and reasonable equivalents thereof.

We claim:

1. Material for use within an aircraft jet engine inlet and nacelle structures wherein said material is exposed to the sound of jet engines and other noise producing mechanisms in acoustical attenuation applications, said material having a predetermined flow through resistance comprising:

(a) a perforated facing sheet;
    (b) a thin sheet of porous material; and
    (c) a bonding medium bonding said porous material to a face of said perforated sheet selected from the class of adhesive systems whose melt viscosity, during the curing process, is sufficiently high so that the adhesive will not flow into the pores of the porous material by capillary attraction so as to maintain the full porosity of the porous material over the perforations of the perforated sheet, thereby isolating said porous material from the adjacent surface of the perforated sheet, the pores of the porous material providing communication between the outer surface of the porous material and the inner face of the perforated sheet.

2. The invention as defined in claim 1 wherein the porous material and perforated sheet are constructed of dissimilar metals whereby the adhesive medium in isolating the porous material and perforated sheet enhances the performance of the structure through improved durability in a corrosive environment by providing electrical insulating therebetween.

3. The invention as defined in claim 1 wherein the porous material and perforated sheet are constructed of different metals whereby the adhesive medium provides insulation between the porous material and perforated sheet thereby preventing the formation of galvanic couples therebetween.

4. The invention as defined in claim 1 wherein the porous material is stainless steel and the perforate sheet is aluminum.

5. The invention as defined in claim 2 wherein said porous material is fibrous.

6. The invention as defined in claim 3 wherein said porous material is fibrous.

7. The invention as defined in claim 4, wherein said porous material is fibrous.

8. The invention as defined in claim 1 wherein said porous material is fibrous.

* * * * *